Feb. 3, 1931.  A. SUNDH  1,791,017

SELF HOLDING DEVICE FOR NUTS

Filed Sept. 12, 1928

INVENTOR.
August Sundh,
BY his
Redding, Greeley, O'Shea & Campbell
ATTORNEYS.

Patented Feb. 3, 1931

1,791,017

UNITED STATES PATENT OFFICE

AUGUST SUNDH, OF HASTINGS-UPON-HUDSON, NEW YORK

SELF-HOLDING DEVICE FOR NUTS

Application filed September 12, 1928. Serial No. 305,370.

In an application filed by the present applicant on March 17, 1928, Serial No. 262,381 there is disclosed and claimed a self-holding device for nuts in which a wrapped spring element is so related to the nut and bolt threads as to hold the nut against displacement with a predetermined force which, when exceeded, results in the positive prevention of any further increase in the holding forces whereby the spring will be turned upon further movement of the nut. The present invention, while embodying some of the characteristics of the aforesaid self-holding device, differs therefrom primarily in that the holding force is wholly dependent on the physical and dimensional characteristics of the spring.

The principal object of the present invention is to provide in a nut self-holding mechanism therefor which is of simple construction, inexpensive to manufacture and assemble and particularly suitable for association with small nuts. In accordance with the invention there is provided a yielding pressure element and a separate metallic spring element which directly engages the threads of the bolt and is subject to the contractive force of the first-named element which surrounds it. The yielding pressure element may be either metallic or non-metallic but it is so related to the gripping spring element as to urge it yieldingly into engagement with the threads of the bolt with a force sufficient to hold the nut against accidental displacement thereon.

In the preferred form of the invention there is provided a hardened and tempered single coil pressure spring one end of which is anchored in the nut and the other of which is free and within which is disposed a single coil soft spring which is sufficiently pliable to conform to the inner periphery of the outer hardened spring and to engage the threads of the bolt intimately with a frictional contact without, however, injuring them. One end of the gripping element is also anchored in the nut, the other end being free. With such a disposition it will be evident that the holding force is dependent on the characteristics of the hardened pressure spring taking into account also the dimensional relationship existing between the hardened spring and gripping element when assembled and the diameter of the bolt to which the nut is applied. These factors can be so controlled in the design as to insure a predetermined frictional grip when the nut is on the bolt. On the other hand, the design is such that no great precision is required in the manufacture or assembly of the parts, the relatively soft gripping element being of such a nature as to adapt itself automatically to the encircling spring element and to the bolt threads.

Reference is now to be had to the accompanying drawings for a clearer understanding of different embodiments of the invention wherein.

Figure 1:
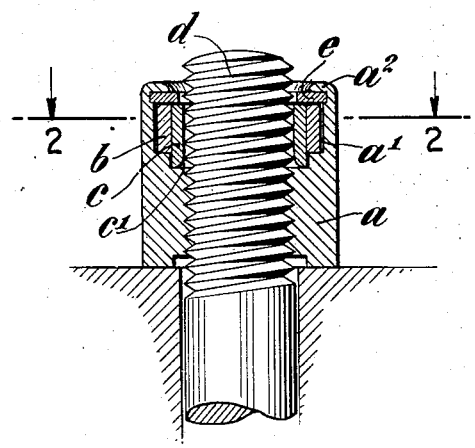
Figure 1 is a view in section showing a nut having the improved device incorporated therein, when applied to a bolt.

The nut $a$ is provided with a cavity $a'$ at one end to receive the elements of the improved self-holding mechanism which comprise generally an outer holding spring $b$ and an inner spring $c$ to grip the threads of the bolt $d$. In the preferred embodiment the spring $b$ will be of hardened and tempered steel while the inner spring $c$ may be made relatively soft, either from steel tempered to a suitable degree or from Monel metal or phosphorous bronze. To facilitate the entry of the bolt threads into the inner spring $c$ it will be advisable to bevel its entering end as indicated at $c'$ and in such a case, for structural reasons, it may be preferable to make the spring $c$ a little wider than the outer spring $b$, as illustrated in Figure 1. At all events, the inner ends of the springs $b$, $c$, will rest on shoulders in the cavity $a'$ and the outer ends will be engaged by a circular retaining plate $e$ which may be secured on the ends of the nut by turning over a circular flange $a^2$ or by any other suitable expedient. By the construction described the springs $b$ and $c$ are held positively against longitudinal displacement within the cavity.

The wall of the cavity may be slotted as at $a^3$ to receive one end of the spring $b$ and the corresponding end of the gripping spring $c$. These springs when assembled are nested and each of a single coil the free ends thereof being spaced from the ends which are anchored in the slots $a^3$ as shown clearly in Figure 2. The anchorage provided holds the two springs fixedly in relation to the nut so that bodily movement of the springs is prevented positively regardless of the direction of turning of the nut.

The strength of the pressure spring $b$ can be predetermined to meet the required conditions, its function being to press the inner gripping spring $c$ into engagement with the threads of the bolt $b$ with such force as may be most effective to hold the nut against accidental movement along the threads up to a predetermined point. The spring $c$ is sufficiently pliable to conform to the inner surface of the spring $b$ so that it receives uniformly the contractive holding force impressed thereon by the spring $b$. Its hardness is such also as not to injure the threads of the bolt when the parts are threaded thereon. The spring $b$, of course, rests loosely within the cavity $a'$ so as to be capable of expansion to a necessary degree to permit entry of the bolt into the spring $c$. The relative dimensions of the springs $b$ and $c$ and the diameter of the cavity and the diameter of the bolt are also all factors which will influence the holding force impressed on the threads of the bolt, as will be apparent.

Figure 2:
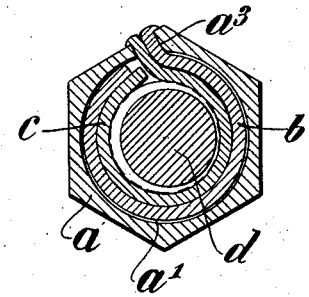
Figure 2 is a transverse sectional view through the nut and bolt shown in Figure 1 and taken on the plane indicated by the line 2—2 of Figure 1 and looking in the direction of the arrows.
Figure 3:
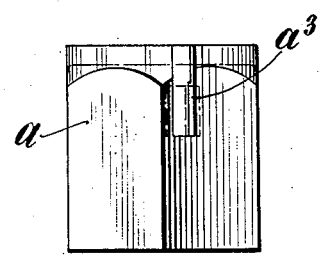
Figure 3 is a view of the exterior of the nut shown in Figures 1 and 2 and illustrating the spring anchorage therein.

When the nut shown in Figure 2 is turned in a clockwise direction to thread it on to the bolt the free ends of the springs $b$, $c$, will tend to leave the threads so that the resistance offered is a minimum. If, however, the nut tends to turn in a counterclockwise direction so as to unthread itself the ends of the springs tend to wrap down on the threads and exert maximum resistance. The maximum holding force, however, is determined by the factors hereinbefore discussed and when it has been exceeded the parts will move along the threads as is desirable when the nut is to be removed with the wrench. The free ends of the springs cannot contact with the anchored ends so no positive or mechanical relief is afforded when the nut is turned off.

Figure 6:
Figure 6 is a view in perspective of the plural gripping springs shown in Figure 4.
Figure 4:
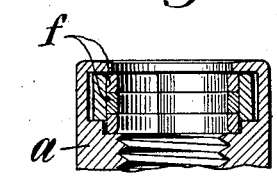
Figure 4 is a sectional view of a modified embodiment wherein the soft gripping elements are plural in number.

As shown in Figures 4 and 6 if desired, for convenience in assembly and to permit ready variance of the holding force the inner spring $c$ may have substituted therefor a plurality of relatively narrow elements $f$ any one or all of which may be removed or replaced.

Figure 5:
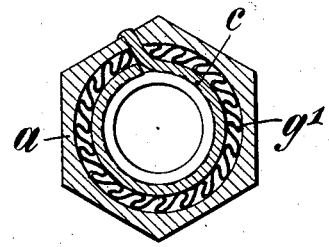
Figure 5 is a view in transverse section through a nut having a different form of pressure element surrounding the soft gripping spring.

In Figure 5 the inner gripping element may be formed as the spring $c$ heretofore described but in place of the outer holding spring $b$ there has been substituted a different form of holding spring indicated at $g'$ which may be formed as a flat spring having plural reverse bends. This spring is compressed within the space between the wall of the cavity and the gripping spring $c$. When the bolt is threaded through the nut the spring $c$ will be expanded but such expansion will be opposed yieldingly by the spring $g'$ and in that way a holding force of predetermined amount is impressed on the threads to prevent displacement of the nut. When the nut is removed from the bolt the holding spring will resume its normal set.

Changes in the construction which are related wholly to matters of design may be made by one skilled in the art without departing from the invention.

What I claim is:

1. In a nut having a threaded portion and a cavity, the combination of a holding device disposed in the cavity and engaged with the nut to rotate therewith, said holding device comprising an inner metallic spring element adapted to engage the bolt threads frictionally and a resilient pressure element secured to the nut to rotate therewith and cooperating with the spring element to urge it in frictional contact with the threads.

2. In a nut having a threaded portion and a cavity portion, a holding device in the cavity portion engaged with the nut to rotate therewith and comprising a single coil spring through which the bolt passes and a spring within the cavity encircling the inner spring and in nested relation therewith to urge the inner spring in frictional contact with the bolt threads.

3. In a nut having a threaded portion and a cavity portion, a holding device in the cavity portion engaged with the nut to rotate therewith and comprising a single coil hardened and tempered spring in the cavity and a soft spring element in the cavity nested in the first named spring to engage the bolt threads, said soft spring element being urged into frictional contact therewith by the outer spring element.

4. In a nut having a cavity therein the combination of a single coil spring having one end anchored to the nut to turn therewith, a soft single coil spring nested in the cavity in the first named spring and having one end rigidly anchored to the nut to turn therewith, said inner spring engaging the bolt threads and maintained in frictional contact therewith by the outer spring element.

5. In a nut having a cavity therein the combination of a single coil spring having one end anchored to the nut to turn therewith, a soft single coil spring nested in the first named spring and having one end rigidly anchored to the nut to turn therewith, said inner spring engaging the bolt threads and maintained in frictional contact therewith by the outer spring element, and means carried with the nut at the end of the cavity portion to maintain the spring elements against longitudinal displacement.

6. In a nut having a threaded portion and a cavity portion, a holding device in the cavity portion, comprising a single coiled spring of wider material than the width of the thread grooves in the threaded portion, and of softer material than the thread on the bolt and held with one end rigidly anchored to the nut to rotate in unison therewith, and a spring pressure device positively held in position relatively to the first named spring within the cavity to press it into frictional contact with the bolt threads.

7. In a nut having a threaded portion and a cavity portion, a holding device in the cavity portion engaged with the nut to rotate therewith and comprising a single coil spring through which the bolt passes and a spring within the cavity encircling the inner spring and in nested relation therewith to urge the inner spring in frictional contact with the bolt threads, the free ends of the coils being so disposed with respect to the bolt as to exert minimum holding force when the nut is turned in one direction and maximum holding force when the nut is turned in the opposite direction.

8. In a nut having a threaded portion and a cavity, a plurality of gripping springs disposed in juxtaposition within the cavity to engage the threads of a bolt, a pressure spring having a width equal at least to the combined width of the gripping springs disposed outside of and in nested relation to said gripping springs, the cavity being of such cross sectional area as to permit circumferential expansion of the pressure and gripping springs when threaded onto the bolt and means to hold all of said springs against longitudinal displacement within the cavity.

This specification signed this 7th day of September, A. D. 1928.

AUGUST SUNDH.